Patented Dec. 26, 1922.

1,440,269

UNITED STATES PATENT OFFICE.

RUDOLF BERENDES AND WILHELM GRÜTTEFIEN, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND.

No Drawing.   Application filed January 12, 1922.   Serial No. 528,832.

*To all whom it may concern:*

Be it known that we, RUDOLF BERENDES and WILHELM GRÜTTEFIEN, citizens of Germany, residing at Elberfeld, Germany, have invented new and useful Improvements in a New Pharmaceutical Compound, of which the following is a specification.

We have found that a new and therapeutically valuable compound can be obtained by treating the calcium salt of glutaminic acid with calcium bromid.

Our new product is after being dried at from 90 to 100° centigrade a whitish salt of neutral reaction and an agreeable taste. It is easily soluble in water and contains upon one molecule of glutaminic acid, 1 atom of bromin, 1 atom of calcium and 1 molecule of water of crystallization. It has proved to be a valuable sedative.

In order to illustrate the process more fully the following example is given, the parts being by weight:

A solution of 147 parts of glutaminic acid in 1000 parts of hot water is saturated with 55 parts of carbonate of calcium. To the filtered liquid an aqueous solution of 105 parts of bromid of calcium is added and the resulting solution evaporated.

Our new compound separates in crystals which are filtered off and washed with a 50 per cent alcohol.

We claim:—

The herein described new compound of glutaminic acid with bromid of calcium, which is after being dried at 90–100° centigrade a whitish salt of neutral reaction and an agreeable taste; being easily soluble in water and being a valuable sedative, substantially as described.

In testimony whereof we have hereunto set our hands in the presence of two subscribing witnesses.

RUDOLF BERENDES.   [L. S.]
WILHELM GRÜTTEFIEN.   [L. S.]

Witnesses:
  HANS BRÜCKNER,
  HERMANN WEYLAND.